United States Patent [19]

Hinoshita et al.

[11] 3,959,726

[45] May 25, 1976

[54] PILOT SIGNAL TRANSMISSION SYSTEM

[75] Inventors: Shigehiko Hinoshita, Yokohama; Shoji Hagiwara, Tokyo, both of Japan

[73] Assignee: Fujitsu Ltd., Kawasaki, Japan

[22] Filed: Sept. 18, 1972

[21] Appl. No.: 289,601

[30] Foreign Application Priority Data

Sept. 18, 1971 Japan.............................. 46-72781
Nov. 13, 1971 Japan.............................. 46-91000

[52] U.S. Cl. ................................ 325/38 A; 325/49
[51] Int. Cl.² ......................................... H04B 1/68
[58] Field of Search................. 325/38 R, 38 A, 49, 325/50, 63; 178/66 R, 69.5 R, 68; 179/15 BS, 15 BP

[56] References Cited

UNITED STATES PATENTS

| | | | |
|---|---|---|---|
| 2,835,889 | 5/1958 | Dyer et al. .......................... | 325/49 X |
| 3,147,437 | 9/1964 | Crafts et al. ...................... | 325/49 |
| 3,196,352 | 7/1965 | Hopner et al.......................... | 325/49 |
| 3,229,209 | 1/1966 | Critchlow et al. ................ | 325/50 X |
| 3,289,082 | 11/1966 | Shumate .............................. | 178/66 |
| 3,312,901 | 4/1967 | Becker et al.......................... | 325/50 |
| 3,588,702 | 6/1971 | Tisi .................................. | 325/38 A |

*Primary Examiner*—Benedict V. Safourek
*Attorney, Agent, or Firm*—Staas & Halsey

[57] ABSTRACT

A pilot signal transmission system is disclosed for the transmission of a digital signal in the form of a multi-level amplitude signal. A synchronizing pilot signal, whose frequency is an integral fraction of the Nyquist frequency of a base band signal or equal to the carrier frequency of an amplitude modulated signal, is transmitted while being coupled in in-phase relation with composite vectors of those components of the digital signal lying in the neighborhood of the frequency of the pilot signal. The transmitted signal is applied to a receiver, wherein the components neighboring the pilot signal frequency are extracted substantially symmetrically with respect to the pilot signal frequency to reproduce the pilot signal and the level of the pilot signal at the time of multilevel decoding is cancelled by a signal of a waveform having a constant amplitude for a certain period of time such as a rectangular, trapezoidal or like wave of a period corresponding to that of the pilot signal.

15 Claims, 30 Drawing Figures

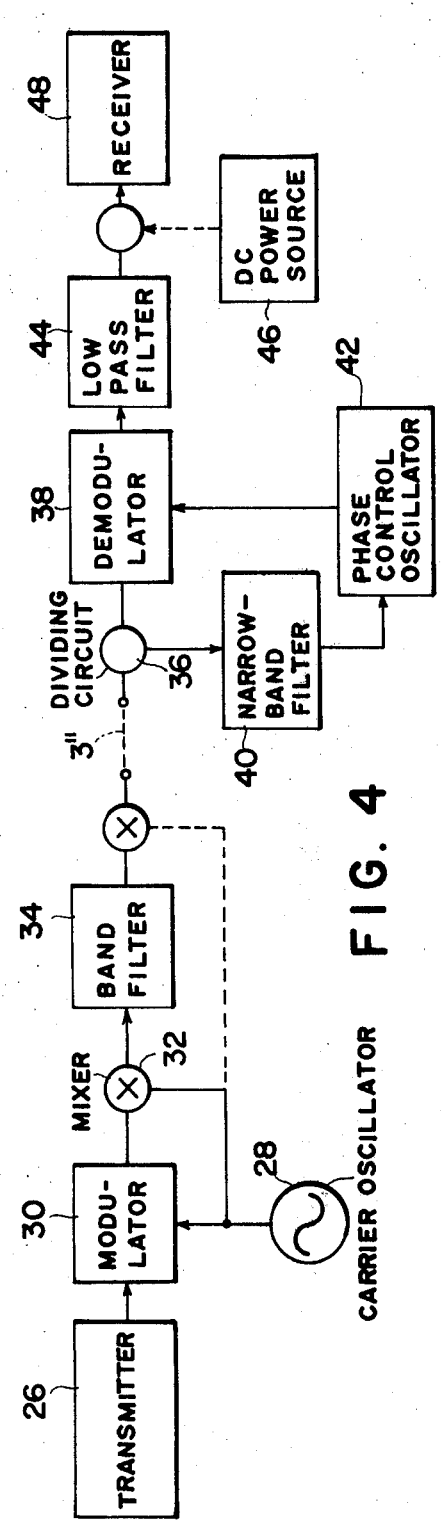
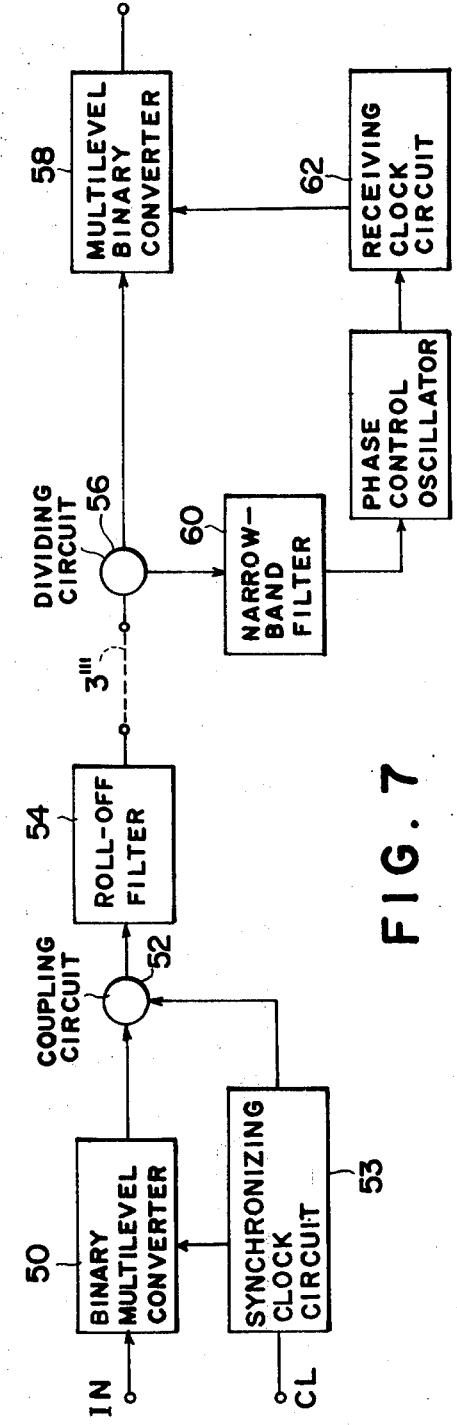
FIG. 4
FIG. 7

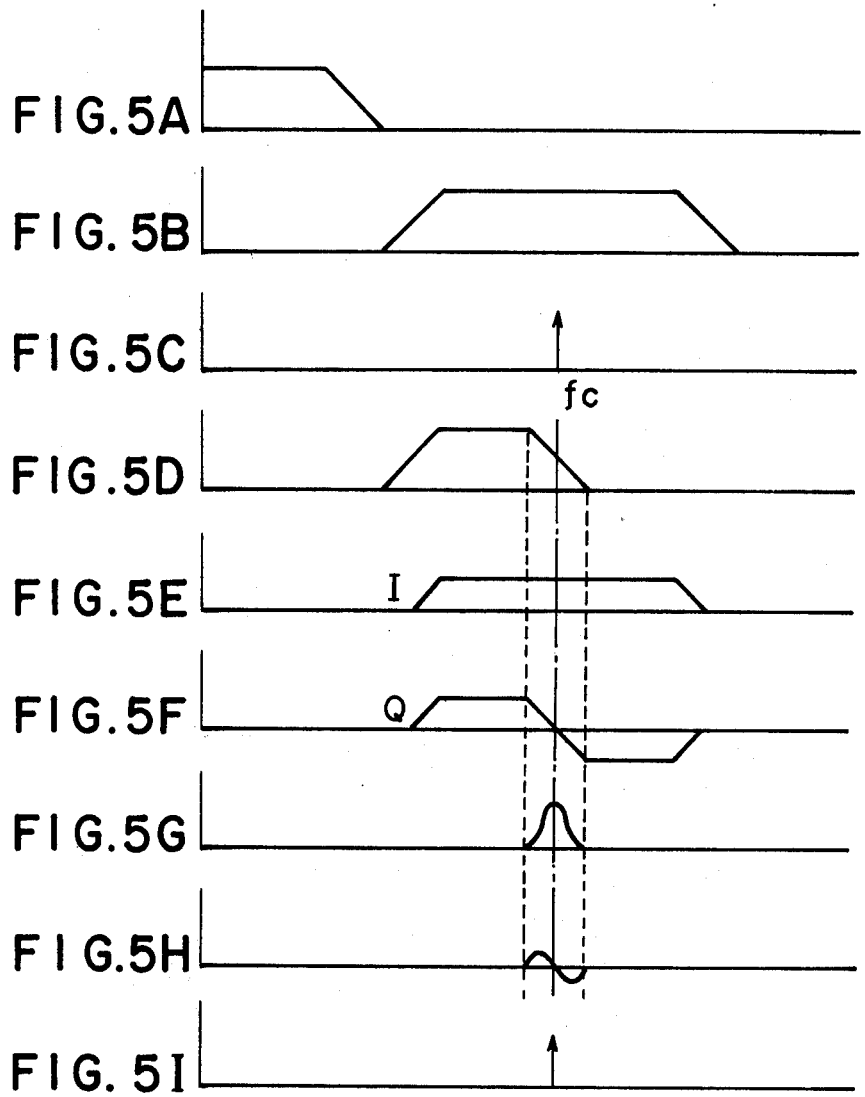

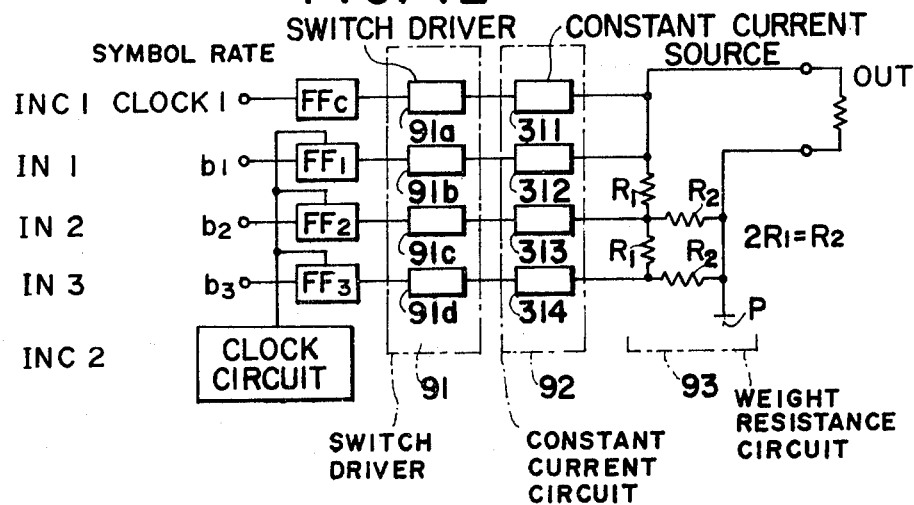
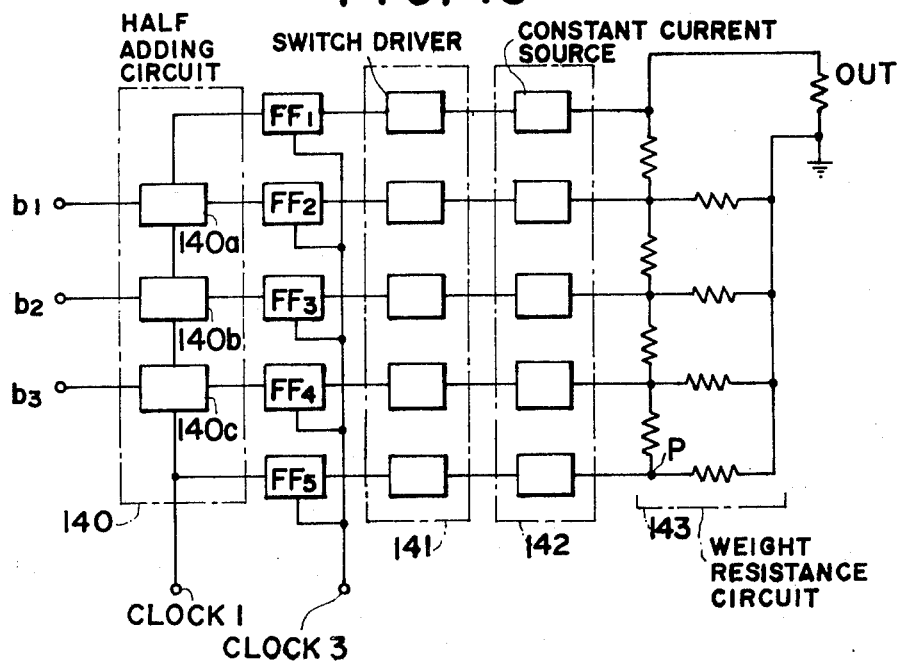

PILOT SIGNAL TRANSMISSION SYSTEM

BACKGROUND OF THE INVENTION

1. Field of the Invention

This invention relates to pilot signal transmission systems, and more particularly to those systems for synchronizing a pilot signal for a multilevel amplitude modulated signal converted from a digital signal.

2. Description of the Prior Art

In data transmission, synchronization is necessary for reproducing transmitted signals. To this end, there has heretofore been adopted a system for synchronizing a clock signal on the receiving side of the transmission line with the symbol rate on the transmitting side or, in the carrier system, a system for synchronization between transmission and reception for synchronous detection. Where the number of the levels is smaller than four, a synchronizing signal can be extracted from the multilevel signal itself on the receiving side but jitter increases with an increase in the number of the levels to make reproduction of the synchronizing signal difficult. To avoid this, a method is generally adopted such that the transmitted signal is transmitted with the synchronizing pilot signal being coupled therewith on the transmitting side and that, on the receiving side, the synchronizing pilot signal is extracted for synchronous reproduction. It is easy to extract the pilot signal because its frequency is selected outside of the transmission signal band, but this technique requires extra band capability and decreases the efficiency of the transmission band. Accordingly, it is desirable to effect signal transmission with a pilot signal frequency being selected within the transmission band. However, there are some occasions when the interference between the transmitted signal and the pilot signal or phase jitter increases. Further, it is necessary to eliminate the pilot signal at the time of multilevel decoding on the receiving side; otherwise, the pilot signal would exert an influence on the transmitted signal level. To perform this operation, where a sinusoidal pilot signal is used, the pilot signal is generally removed by adding thereto a sine wave which is equal in frequency and amplitude, but opposite in phase thereto.

For example, FIG. 1 shows the frequency relationship between a digital signal spectrum S and a sinusoidal pilot signal P. The frequency of the pilot signal P is selected to be one-half of the symbol rate of the digital signal and, as depicted in FIG. 2, the digital signal is converted by a binary-multilevel converter 1 into a ternary, quaternary or like multilevel signal and is superimposed on the pilot signal P by a superimposing circuit 2 and transmitted from a transmitting station to a receiving station through a transmission line 3. In the receiving station, the pilot signal P is extracted by a pilot signal extracting circuit 4 for synchronous reproduction and, in a cancelling circuit 5, the pilot signal contained in the received signal is cancelled. Then, the received signal is subjected to multilevel decoding and converted by a multilevel decoding circuit 6 into a digital signal to provide an output signal at an output terminal OUT. It is necessary to dispose an equalizing and shaping filter for providing an rectangular waveform free from intersymbol interference at an appropriate position between the binary-multilevel converter 1 of the sending station and the multilevel decoding circuit 6 of the receiving station but this circuit is omitted in FIG. 2. Further, a clock circuit 7 is controlled with the output of the pilot extracting circuit 4 for synchronous reproduction. In the multilevel decoding circuit 6, the multilevel decoding is effected with the output of the clock circuit 7 and the decoding is usually achieved at the time the pilot signal is of maximum positive and negative values. Alternatively, sampling may be effected at a desired certain level of the pilot signal.

With conventional systems, where a steady phase error, phase jitter or amplitude error is caused by the incomplete operation of the pilot extracting circuit 4 to provide a digital signal by cancelling the sinusoidal pilot signal with a sine wave (as described above), the pilot signal cannot be completely removed and this introduces an error in the multilevel decoding. The incomplete operation of the pilot sampling circuit 4 is unavoidable because of its phase characteristic due to a narrow band filter provided for sampling the pilot signal from the signal spectrum and the transmitted signal serving as a source of jitter of the pilot signal. Accordingly, it is difficult to set the amplitude and phase of the pilot signal which enables the pilot signal to be completely cancelled, so that it is impossible to prevent errors.

In the transmission line of the conventional pilot synchronizing system, as shown in FIG. 3, a digital input signal is converted by a binary-multilevel converter 11 into a multilevel signal, which is rolled off by a band width control filter 12. A sine wave, which has a frequency one-half of a clock signal produced by supplying a filter 14 with a clock signal whose frequency is reduced to one-half by a clock circuit 13, is coupled with the output of the band width control filter 12 as a pilot signal. The clock circuit 13 also provides a timing signal for the binary-multilevel conversion based on the transmitted clock signal.

Further, in a modulator 15, the signal coupled with the pilot signal is modulated with a carrier derived from an oscillator 16 and is subjected to band width control by a band filter 17. A sine wave of the carrier frequency is coupled with the output of the band filter 17 as a pilot signal.

The composite signal thus obtained is transmitted from a transmission section to a receiving section through a transmission line 3' (for example, a conventional FDM line). In the receiving section, the received signal is applied through a receiving band filter 18 to a demodulator 19, to be demodulated with a carrier reproduced by a carrier reproducing circuit 20. The demodulated signal is then divided into first and second signals: the first signal is applied to a sampling timing signal reproducing circuit 21 to provide a synchronized sampling pulse, which is applied to a pilot eliminating circuit 22 to eliminate the pilot signal contained in the second signal fed thereto. The signal having removed therefrom the pilot signal is converted by a multilevel decoder 23 into a binary signal, thus completing transmission of one section of data.

In FIG. 3, reference numeral 24 indicates a circuit which provides a decoding timing signal for the multilevel decoder 23 based on the output of the sampling timing signal reproducing circuit 21.

In the coupling of the multilevel signal with the pilot signal, it is absolutely necessary to establish the phase relation therebetween phase synchronization on the receiving side and, further, for establishment of a certain phase relation therebetween is convenient for various signal processing. In regard to establishing the phase relationship, the conventional system shown in FIG. 3 presents problems such as inaccurate phase relationship between the multilevel signal and the pilot signal due to phase variations of the filters (12, 14 and 17), deterioration of the analog signal resulting from coupling of the analog signal with the pilot signal by means of the analog circuit and complexity in the circuit construction for improvements therefor.

SUMMARY OF THE INVENTION

Therefore, it is an object of this invention to provide a pilot signal transmission system which does not require any extra bandwidth for transmitting a pilot signal for synchronization use and in which phase jitter of a reproduced pilot signal is substantially reduced.

Another object of the invention is to provide a pilot signal transmission system in which a pilot signal is cancelled on the receiving side to prevent an error based on phase variations.

Still another object of this invention is to provide a pilot signal transmission system in which a transmitted multilevel signal and a pilot signal are coupled with each other in an accurate phase relation.

Briefly stated, this invention resides in a pilot signal transmission system in which a synchronizing pilot signal, whose frequency is an integral fraction of the Nyquist frequency of a base band signal or equal to the carrier frequency of an amplitude modulated signal, is transmitted with a multilevel digital signal while being coupled with composite vectors of those components of the multilevel digital signal in the neighborhood of the frequency of the pilot signal in an in-phase relation thereto. In the receiving station for the signal thus transmitted, the components of the received signal neighboring the pilot signal frequency are sampled substantially symmetrically with respect to the pilot signal frequency to reproduce the pilot signal. The level of the pilot signal at the time of multilevel decoding is cancelled with a signal of a waveform having a constant amplitude for a certain period of time such as a rectangular or like wave of a period corresponding to that of the pilot signal. Further, the phase relationship between the multilevel digital signal and the synchronizing pilot signal, in coupling them, is based on the phase difference of two clocking pulses.

BRIEF DESCRIPTION OF THE DRAWINGS

FIG. 4 is a block diagram showing one example of the pilot signal transmission system of this invention;

FIGS. 5A to I are diagrams for explaining the operation of the system of FIG. 4;

FIG. 7 is a block diagram illustrating another illustrative embodiment of this invention;

FIGS. 12 and 13 are block diagrams showing examples of a circuit for coupling the pilot signal in accordance with this invention.

DESCRIPTION OF THE PREFERRED EMBODIMENTS

Figure 1:
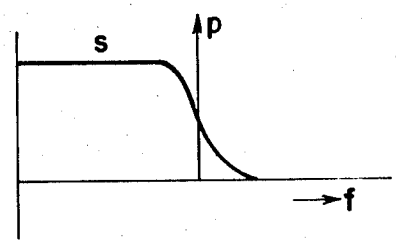
FIG. 1 is a graph, for explaining the frequency relationship between a digital signal spectrum and a sinusoidal pilot signal.
Figure 2:
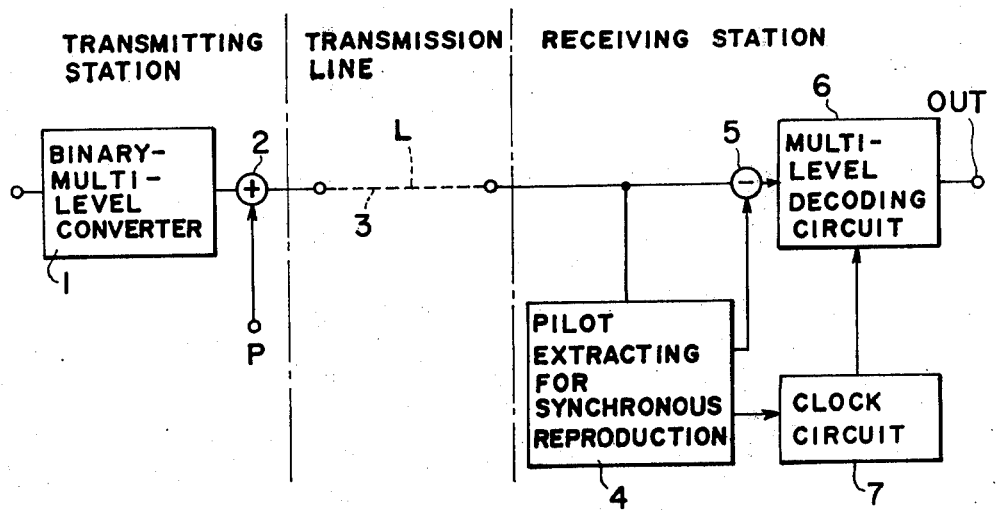
FIG. 2 is a block diagram showing a multilevel amplitude modulated digital signal transmission system of the prior art.
Figure 3:
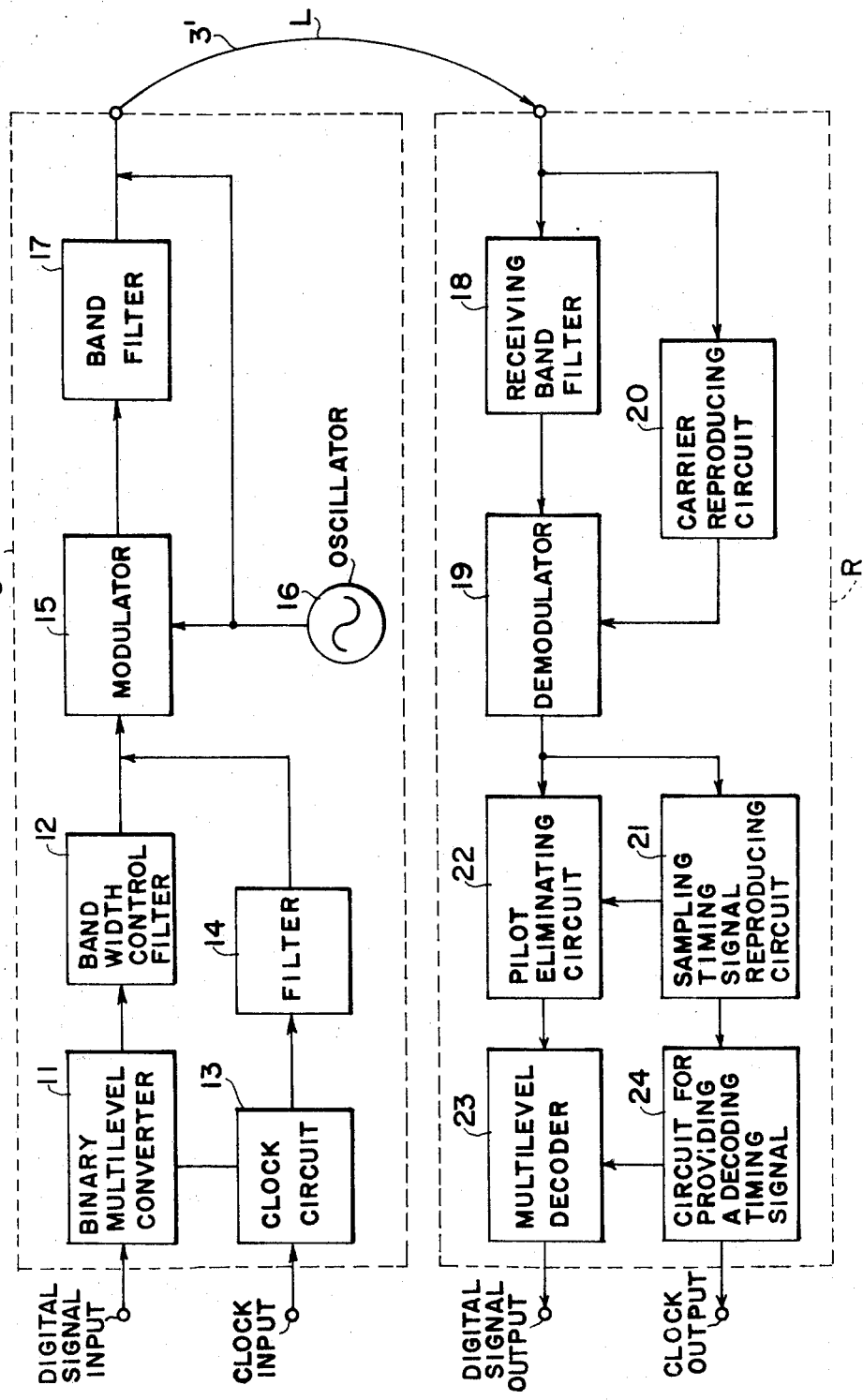
FIG. 3 is a block diagram illustrating a conventional transmission system of a pilot synchronizing system.

FIG. 4 illustrates in block diagram, one example of this invention, which relates to the carrier system. A multilevel digital signal derived from a transmitter 26, which has such a spectrum as depicted in FIG. 5A, is modulated with a carrier derived from a carrier oscillator 28 in a modulator 30 to provide a DSB (double side-band) signal such as shown in FIG. 5B. A carrier signal fc (shown in FIG. 5C) derived from the carrier oscillator 28 is inserted as a pilot signal into the output of the modulator 30 by means of a mixer 32. The DSB signal is filtered by a band filter 34 into a VSB (vestigial side-band) signal such as depicted in FIG. 5D. The VSB signal includes an in-phase component I and an quadrature component Q as shown in FIGS. 5E and 5F, respectively. The amount of the quadrature component Q lying in the neighborhood of the carrier signal fc is small. It is also possible to insert the pilot signal at the output side of the band filter 34 as indicated by a broken line.

When received at the receiving station through a transmission line 3'', the received signal is divided by a dividing circuit 36 to provide first and second signals. The first signal is applied to a demodulator circuit 38 and the second signal is fed to a narrow-band filter 40, in which the frequency components lying in the neighborhood of the carrier signal fc are extracted substantially symmetrically; these components are composed of the in-phase component, the quadrature component and the carrier pilot signal such as shown in FIGS. 5G, 5H and 5I respectively. The output of the narrow-band filter 40 may be used as a synchronizing pilot signal and is fed to a phase control oscillator 42 to provide an output which is used as the synchronizing signal to reduce jitter. Since the signal demodulated by the demodulator 38 has upper and lower side bands, the lower side band is extracted by a lowpass filter LF. The lower side band contains a DC component corresponding to the base band signal and the pilot signal. In order to remove the DC component corresponding to the pilot signal, a voltage is impressed from a DC power source 46 in a manner to cancel the DC component. Thus, the multilevel digital signal is transmitted from the transmitter 26 to a receiver 48 through the transmission line 3''.

Figure 6A:
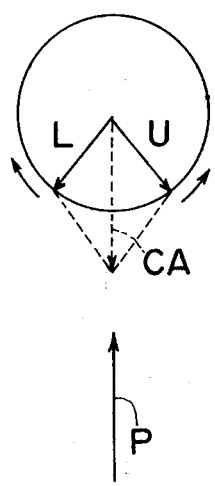
FIGS. 6A, 6B and 6C are vector diagrams, for explaining the principle of this invention.

The aforesaid pilot signal is inserted into the modulated wave from the modulator 30 in an in-phase relation thereto. In FIG. 6A, reference character CA indicates the phase of a carrier modulated by the modulator 30, and U and L refer to upper and lower side bands of a certain frequency component of the input digital signal. The upper and lower side bands turn in opposite directions and their composite vector is in-phase with the modulated carrier and does not contain any quadrature component. A pilot signal P is mixed with the modulated wave in an in-phase direction. Accordingly, in the DSB modulation, the component lying in the neighborhood of the carrier is extracted on the receiving side to provide only the vector component of the in-phase direction, so that even if amplitude jitter remains to a small degree, no phase jitter exists.

Figure 6B:
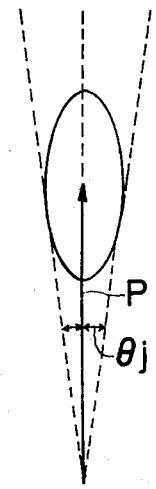
Figure 6C:
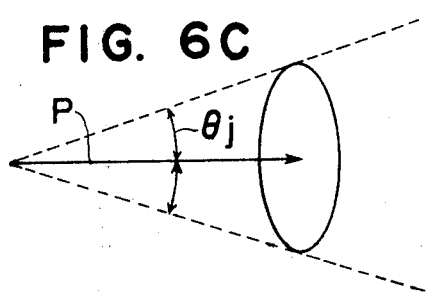

Further, in the VSB modulation, VSB formation is effected and the amplitudes of the upper and lower side bands U and L become unbalanced and the composite vector includes an quadrature component. When the resulting signal is filtered by the narrowband filter 40 of the receiving side, the quadrature component lying in the neighborhood of the carrier is very small, so that the locus of the composite vector of the upper and lower side bands U and L becomes elliptical and the composite vector with the pilot signal P has a very slight phase variation $\theta j$, as seen in FIG. 6B. By narrowing the frequency band to be selected by the filter 40 or the phase control oscillator 42, or by forming the composite vector in a manner to provide a substantially symmetrical spectrum, the quadrature component further decreases as compared with the in-phase component and the phase jitter $\theta j$ becomes even smaller. When the pilot signal P is inserted into the carrier in phase quadrature relation thereto, the resulting composite vector is such as shown in FIG. 6C corresponding to FIG. 6B. In this case, it is defective in that the phase jitter $\theta j$ is great. However, this quadrature pilot signal is advantageous in that it is not contained in the demodulated output from the demodulator 38.

In accordance with the present invention, the pilot signal is inserted in the modulated wave in a direction in-phase therewith, but in the output of the demodulator 38 of the receiving station, the DC component corresponding to the pilot signal acts as a disturbance component to the multilevel digital signal. In such a case, the DC component of the received signal is cancelled by applying a DC voltage of a phase opposite thereto at the receiving station, as described previously, or the threshold level of the demodulated output is changed corresponding to the DC component in the multilevel decoding circuit. Further, where the low-frequency component of the digital signal does not exist or it is not important, the DC component corresponding to the pilot signal is cut off by means of a capacitor or the like and thus the disturbance component can easily be removed.

Figure 8A:
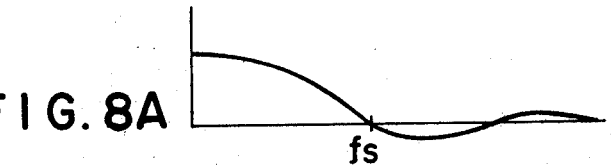
FIGS. 8A to D are diagrams, for explaining the operation of the embodiment of FIG. 7.
Figure 8B:
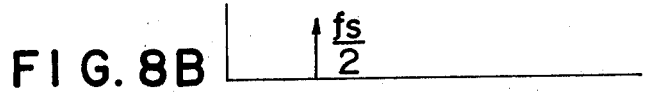

FIG. 7 illustrates in block diagram, another example of this invention whicch is adapted for symbol rate synchronization. A binary signal to be transmitted is supplied at an input terminal IN to a binary-multilevel converter 50, in which it is converted into a multilevel signal of a symbol rate $fs$. The multilevel signal is in turn applied to a coupling circuit 52, to be coupled with a synchronizing pilot signal derived from a clock circuit 53 supplied with a clock signal CL. Assuming that the multilevel signal has such a spectrum as shown in FIG. 8A, transmission without intersymbol interference according to Nyquist's theorem is achieved by rolling off the spectrum in an odd-symmetrical manner at a frequency one-half of the frequency of the symbol rate. In order to facilitate reproduction of the frequency fs in phase synchronization at the receiving station, it is convenient that the pilot signal frequency is $fs/2$.

In FIG. 7, reference numeral 54 designates a roll-off filter, which is a filter for forming a spectrum for equalization to reduce intersymbol intereference to zero and the output of which is transmitted to the receiving side through a transmission line 3'''. The filter 54 may be provided in the transmission line 3''' or on the receiving side. This transmission system is a base band system, as shown, or could be modified to be a carrier system by the addition of suitable carrier modulation and demodulation components as shown in FIG. 4, for example.

Figure 8C:
Figure 8D:
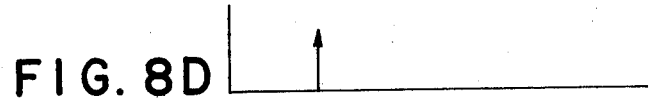

At the receiving station, in a dividing circuit 56, the received signal is divided into first and second signals: the first signal is applied to a multilevel-binary converter 58 and the second signal is fed to a narrow-band filter 60. Assuming that the spectrum of the received signal is such as depicted in FIG. 8C, a component which is substantially symmetrical with respect to the frequency $fs/2$, that is, the pilot signal component, is sampled by the narrow-band filter 60 as shown in FIG. 8D. The pilot signal component may be applied as it is to a receiving clock circuit 62 but it is preferred to apply this component to a phase control oscillator 64 to suppress jitter. The output of the receiving clock circuit 62 is employed for symbol synchronization of the multilevel-binary converter 58, for example, for timing of sampling or the like, by which the output of the multilevel-binary converter 58 is converted into the transmitted binary signal.

The output of the narrowband filter 60 in this example is substantially symmetrical with respect to the pilot signal frequency, the latter being depicted in FIG. 8D, and thus can be considered in the same way as the waveform shown in FIG. 5G, so that the explanation given in connection with FIG. 6 can be applied. Namely, the upper and lower side bands U and L correspond to the upper and lower side band components of $fs/2$ and when the pilot signal P is coupled in an in-phase relation to their composite vector as in the case of FIG. 6A, no phase jitter exists. If the upper and lower side bands U and L are asymmetrical, the locus of their composite vector is elliptic as shown in FIGS. 6B and 6C and a component orthogonal to the pilot P is produced. However, where the pilot signal P is coupled with the composite vector in such a relation as shown in FIG. 6B, the phase jitter is present only to a small degree.

In FIG. 8, the pilot signal frequency is $fs/2$ but it is not always limited thereto and may be an integral fraction of fs. In such a case, however, the spectrum in the neighborhood of $fs/n$ is extracted substantially symmetrically with respect to $fs/n$ and then multiplied by $n$, by which the component in the neighborhood of $fs$ is made in-phase with $fs$, $n$ mentioned above being an integer.

In order to couple the pilot signal with the digital signal in an in-phase relation thereto, a signal corresponding to the pilot signal frequency is sent out in the form of a digital signal and the phase of the pilot signal is selected equal to that of the digital signal. This implies that the coupling of the pilot signal to the digital information signal can be accomplished by addition of the two signals in the binary-multilevel converter 50 in a digital manner.

Consequently, a pilot signal of little phase jitter is extracted by the narrow-band filter 60 but since the received signal is composed of the multilevel digital signal and the pilot signal superimposed thereon, it is desirable to remove the pilot signal component. The pilot signal component can readily be removed by cancelling it from the received signal, by means of the reproduced pilot signal or a rectangular wave appropriately established according to the phase of the reproduced pilot signal at the time of multilevel decoding, or by subtracting the pilot signal component from the received signal in a digital manner after the level decoding by the multilevel-binary converter 58.

As has been described in the foregoing, the pilot signal transmission system of this invention is significant in that it does not require any extra band for the pilot signal transmission and in that phase jitter is very slight in the pilot signal reproduced at the receiver.

Figure 9A:
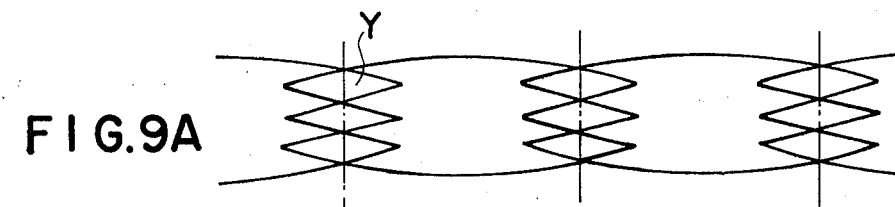
FIGS. 9A to C are diagrams, for explaining the operation of another example of this invention.
Figure 9B:
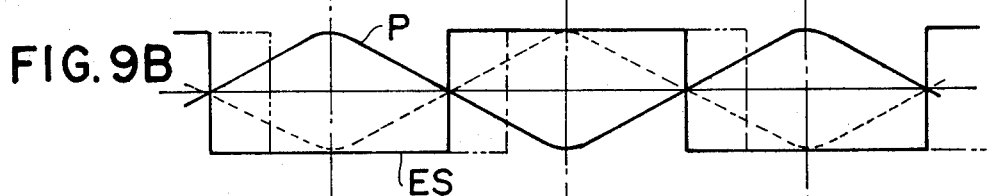
Figure 9C:
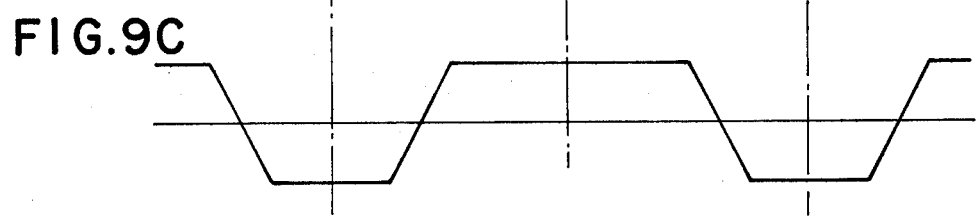

FIGS. 9A to C are waveform diagrams for explaining the operation of another example of this invention, FIG. 9A being an "eye" diagram in the case of a quaternary signal, FIG. 9B being a diagram showing the waveforms of the sinusoidal pilot signal P and a signal for erasing it, and FIG. 9C being a diagram showing another example of the erasing signal. The multilevel decoding of the digital signal is achieved in the eye openings Y in FIG. 9A and even if the waveform is out of order in those areas where no eye opening exists, it does not matter for multilevel decoding, since the objectives can be attained merely by erasing the pilot signal at the time of multilevel decoding. Therefore, the present example employs, for example, a rectangular erasing signal ES. In the prior art, a sinusoidal signal such as indicated by a dotted line, which is opposite in phase to the pilot signal, is used and error is introduced by phase and amplitude changes. Even if a phase variation such, for example, as indicated by the broken line of long and double short segments exists in the rectangular erasing signal ES, there are no deleterious results at the time of decoding. The duty ratio of the rectangular wave need not be 50 percent as shown, but instead the erasing signal may be such a signal of a constant amplitude which is capable of cancelling the voltage level of the pilot signal P only in the neighborhood of the eye opening Y, so that it may also be a trapezoidal wave such as shown in FIG. 9C. Namely, a waveform, which has a constant amplitude for a certain period of time encompassing the time of multilevel decoding, is used as an erasing signal and no error is produced in response to a phase change occurring while the amplitude of the erasing signal is constant, as described previously.

Figure 10:
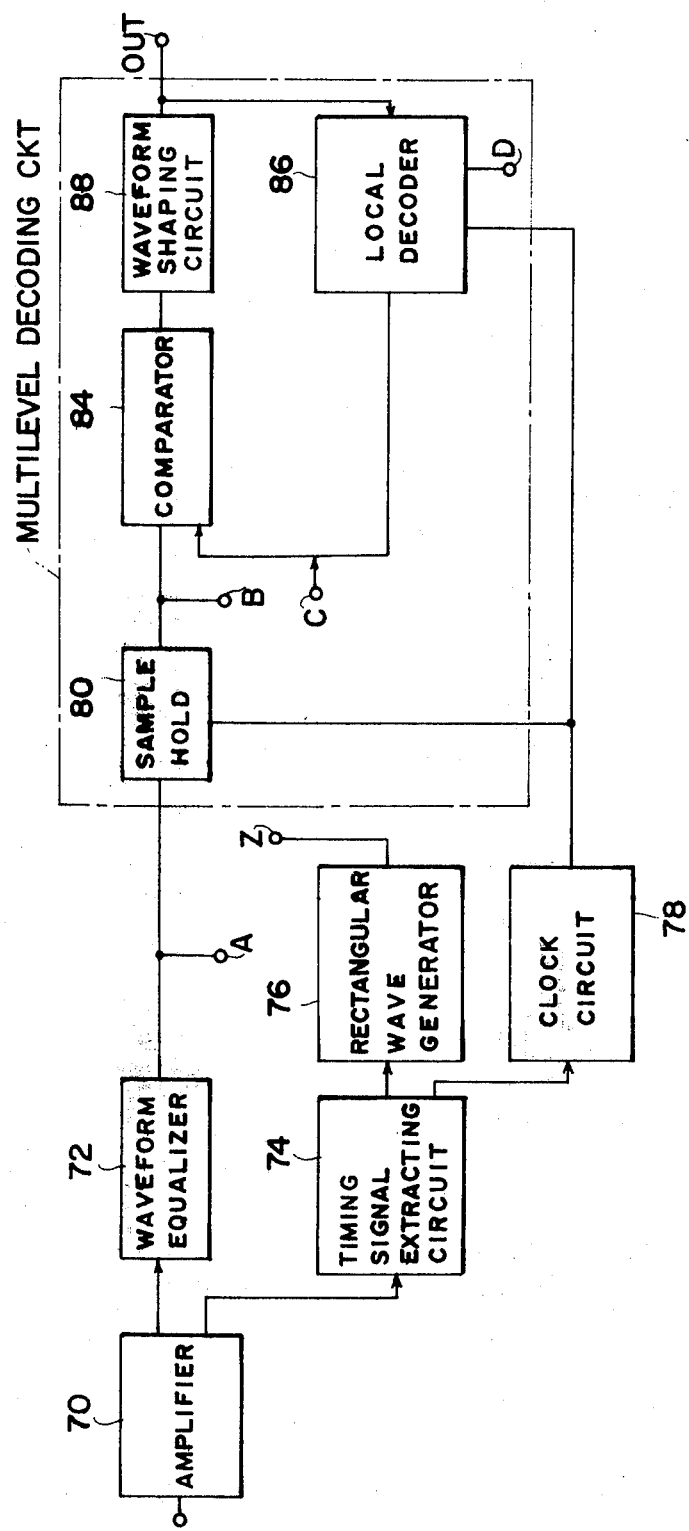
FIG. 10 is a block diagram showing a detailed circuit construction of an embodiment of this invention.

FIG. 10 is a block diagram showing a receiver incorporating this feature of this invention. The received signal is amplified by an amplifier 70 and one part of its output is applied to a waveform equalizer 72 and the other part to a timing signal extracting circuit 74. A pilot signal is extracted by the timing signal extracting circuit 74, by which a rectangular wave generator circuit 76 and a clock circuit 78 are controlled. The output of the waveform equalizer 72 is applied to a sample and hold circuit 80, the sampling and holding function being controlled by a clock signal derived from the clock circuit 78. An output terminal Z of the rectangular wave generator circuit 76 is connected to any one of terminals A to D, by which the pilot signal can be erased. When the terminal Z is connected to terminal A, the pilot signal is erased at the input to the multilevel decoding circuit 82, and specifically at the multilevel decoding time intervals as depicted in FIG. 9B. When the terminal Z is connected to terminal B, the pilot signal is erased or cancelled at the ouput of the sample and hold circuit 80 and when terminal Z is connected to the terminal C, the pilot signal is erased equivalently by applying it and a reference voltage to a comparator circuit 84 for multilevel decoding use. The reference voltage is derived as an output of a local decoder 86. It is also possible to provide the reference voltage by interconnecting the terminals Z and D, coinciding the amplitude of the pilot signal at the time of multilevel decoding with two selected levels of the multilevel signal and directly achieving logical addition of the pilot signal level; this technique provides an advantage that the circuit can be fabricated as a complete digital integrated circuit. In FIG. 10, reference numeral 88 indicates a waveform shaping circuit, by means of which the output waveform of the comparator 84 is shaped into a train of pulses.

As has been described in the foregoing in the present invention, the sinusoidal pilot signal is erased at the time of multilevel decoding, by the erasing signal of a rectangular, trapezoidal or like waveform having a constant amplitude for a certain period of time. As a result, no error is produced by a phase change and the rectangular wave can easily be made constant in amplitude. Thus, with a simple construction, the present invention enables removal of the cause of an error which is introduced by the sinusoidal pilot signal superimposed on the multilevel amplitude digital signal at the time of multilevel decoding. Digital processing for cancelling the pilot signal level is also possible by a direct logical operation during multilevel decoding and may be accomplished readily, merely requiring that the number of levels to be decoded is increased correspondingly.

Figure 11A:
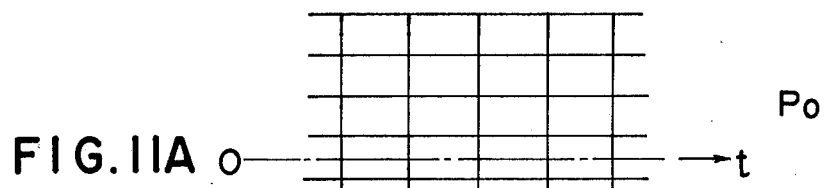
FIGS. 11A to C are diagrams for explaining the coupling of a pilot signal in accordance with the teachings of this invention.
Figure 11B:
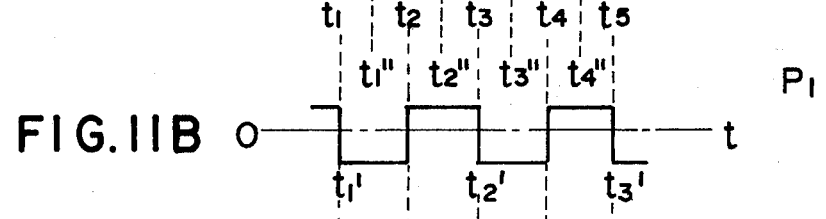
Figure 11C:
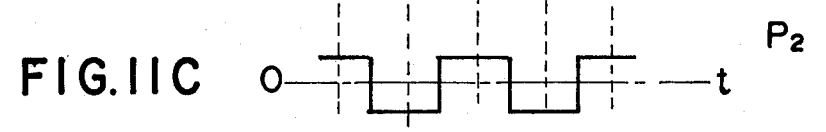

Thus, it will readily be understood that if a rectangular waveform of the pilot signal is coupled with a PAM waveform of an eight-level signal by a common clock signal at the stage of a digital waveform in the digital section as shown in FIG. 11, their phase relationship is established and any phase variation is small. FIG. 11A shows an eye pattern PO of the eight-level signal PAM, that is, an image of a pattern drawn on a synchroscope, the abscissa representing time $t$ and the ordinate, amplitude. FIG. 11B shows a pilot signal P1 which is in-phase with the eight-level signal and FIG. 11C shows a pilot signal P2 whose phase is orthogonal to the eight-level signal. When the eye pattern PO of FIG. 11A and the pilot signal P1 of FIG. 11B are coupled with each other, the phase jitter of the pilot signal is minimal at the time of extracting the pilot signal at the receiver, because the pilot signal and the multilevel signal are in-phase with each other. However, the level of the multilevel signal is changed by the pilot signal at the time of sampling, so that the pilot signal must be cancelled eliminate the level change caused by the pilot signal. Coupling of the eye pattern PO and the pilot signal P2 with each other causes an increase in phase jitter because the pilot signal and the multilevel signal are not in-phase with each other. However, since the level of the pilot signal becomes zero at the time of sampling of the multilevel signal, the multilevel signal is not disturbed. The phase relationship of a clock signal in the digital implementation can be established more easily and is more stable than in an analog implementation, including the cases where the multilevel signal and the pilot signal are coupled with each other in other than in a phase relation. The present invention is based upon such principles.

FIG. 12 illustrates another example of this invention, in which a pilot signal having a frequency $fs/2$ (fs being a symbol rate frequency) is coupled with an eight-level signal. Namely, inputs IN1 to IN3 are supplied with bits b1 to b3 respectively. The octernary value is represented by the combination of the bits b1 to b3. Reference characters FF1 to FF3 indicate flip-flop circuits serving as input registers, and in which the bits b1 to b3 are set by a clock signal 2 respectively.

Reference numeral 91 designates a group of switch drivers, which are selectively energized corresponding to that one of the flip-flop circuits FF1 to FF3 which is set at "1", and numeral 92 refers to a group of constant-current circuits. Reference numerals 312, 313 and 314 identify constant-current sources for producing the same constant current. Thus, a constant current is supplied to a weighted resistance circuit 93 from that constant-current source which is energized by the switch driver 91. Reference numeral 311 indicates a constant-current source which supplies the weighted resistance circuit 93 with a constant current which is different from that derived from the constant-current sources 312, 313 and 314.

In the weighted resistance circuit 93, weighting for the bits b1 to b3 is given by the combination of resistors $R_1$ and $R_2$. Namely, even if the same constant current is supplied from the constant-current sources 312 to 314, the greatest weighting is given to the bit b1. A symbol clock signal $fs$ applied to an input terminal INC1, is frequency divided by a flip-flop circuit FFc to $fs/2$ and applied to the switch driver 91a; the resultant constant current is supplied from the constant-current source 311 to the weighted resistance circuit 93. In the case of the bits b1 to b3, a similar operation occurs, controlled by clock 2. At an output terminal OUT, the pilot signal is thus coupled with the eight-level or octernary signal.

Namely, as depicted in FIG. 11, clock pulses 1 and 2 are applied to terminals INC1 and INC2 at times $t1, t2, t3, \ldots$ respectively. However, since the clock 1 is frequency divided by the flip-flop circuit FFc to one-half, a pilot signal having a repetitive cycle indicated by $t1', t2', t3', \ldots$ as shown in FIG. 11B is coupled with the eight-level signal. Then, their phase relation at the time of coupling can be accurately established, with the phase of the multilevel digital signal being determined by the clock 2 in the digital section and with that of the pilot signal being determined by the clock 1 fed to the input terminal INC1 as shown in FIG. 12. Thus, it will be easily seen that the phase relation is more stable and easier to establish than in the case of coupling with an analog circuit of the prior art system. Namely, for example, when the timing of the clock 1 is selected as indicated by $t1'', t2'', \ldots$ instead of $t1, t2, \ldots$, an quadrature pilot signal such as shown in FIG. 11C is coupled with the eight-level signal. The magnitude of the pilot signal voltage can be established at will by appropriately selecting the magnitude of the constant current in the constant-current source 311 for the pilot signal and the coupling position (the magnitude of weight) of the pilot signal in the weight resistance circuit 93.

With the operation described above, coupling of the pilot signal with the eight-level signal is achieved in the weight resistance circuit shown in FIG. 12 but it is also possible to achieve the coupling by adding the information bits b1 to b3 with the pilot signal bit by direct logic combination in a digital circuit on the input side.

FIG. 13 is a block diagram showing one example therefor, which also utilizes the principle of this invention that the phase of the coupled pilot signal is set according to that of the clock pulse.

In FIG. 13, reference numerals 141, 142 and 143 designate respectively a group of switch drivers, a group of constant-current sources and a weighted resistance circuit corresponding to those shown at 91, 92 and 93 in FIG. 12. The reference characters FF1 to FF5 designate flip-flop circuits serving as registers and their set timing is carried out by a clock signal 3.

Reference numerals 140a, 140b, 140c identify half-adding circuits, in which "carry" is achieved when two inputs thereto are both 1 and the added results are stored and applied to the flip-flop circuits FF2, FF3 and FF4 respectively. The circuit of FIG. 13 shows the case where a pilot signal of a level one-half of a unitary signal (one step) is coupled as the pilot signal level in an in-phase relation. Accordingly, the multilevel signal and the pilot signal are set solely by the clock 1 in the flip-flop circuit FF5 and by applying the constant current to a point P of the weighted resistance circuit 143, the level one-half is derived at the output terminal OUT. Thus, in the circuit of FIG. 13, the coupling is achieved by a logical operation of the pilot signal and the eight-level signal bits b1 to b3 in a section indicated by 140 and the result appears in the form of an analog level in the weighted resistance circuit.

As has been described in the foregoing, in the present invention the multilevel digital signal and the pilot signal can be coupled with each other easily and accurately by determining their coupling phase relationship according to the phase relationship of the clock signal.

It will be apparent that many modifications and variations may be effected without departing from the scope of the novel concepts of this invention.

What is claimed is:

1. A transmission system utilizing a pilot signal comprising:
   a. transmission means for transmitting a multilevel amplitude digital signal with a pilot signal imposed thereon to receiving means;
   b. said transmission means including means for providing a clocking signal establishing a symbol rate $fs$, means receiving a binary input information signal and responsive to the clocking signal for producing a multilevel amplitude digital signal output, and means responsive to the symbol rate fs of the clocking signal for producing the pilot signal at a frequency rate $fs/N$ (where $N = 2, 3, 4, \ldots$) and for coupling the pilot signal to the multilevel amplitude signal in in-phase relationship thereto for developing the multilevel digital signal to be transmitted; and
   c. said receiving means comprising filter means for extracting the frequency components of the transmitted signal in a range above and below the frequency rate $fs/N$ of the pilot signal, and multilevel decoding means responsive to the pilot signal frequency as derived from the frequency components extracted by said filter means, and to the said transmitted signal as received by said receiving means, for providing a decoded signal.

2. The transmission system as claimed in claim 1, wherein said receiving means includes means responsive to the said pilot signal derived from said extracted frequency components for erasing the pilot signal component of the received multilevel amplitude signal, at each time of multilevel decoding.

3. The transmission system as claimed in claim 2, wherein said erasing means provides a signal having a period corresponding to that of the pilot signal and an amplitude constant for a predetermined time interval encompassing each time of multilevel decoding.

4. The transmission system as claimed in claim 3, wherein said erasing means provides a signal of a rectangular waveform.

5. The transmission system as claimed in claim 3, wherein said erasing means provides a signal of trapezoidal waveform.

6. The transmission system as claimed in claim 3, wherein said erasing means produces an erasing signal in response to the said derived pilot signal and applies the said erasing signal to the input of said sample-hold circuit to effect the removal of the pilot signal component of the transmitted multilevel amplitude digital signal.

7. The transmission system as claimed in claim 3, wherein said erasing means applies said erasing signal to the output of said sample-hold circuit to thereby effect the erasing of the pilot signal component of the transmitted multilevel amplitude digital signal.

8. The transmission system as claimed in claim 2, wherein the output of said filter means is applied to said erasing means for providing the erasing signal and to clock means for providing in response thereto a clock signal, said multilevel decoder means comprising a sample-hold circuit for receiving the transmitted multilevel amplitude digital signal and responsive to the clock signal for sampling the received signal, a comparator circuit for receiving and comparing the received and sampled multilevel amplitude signal with a reference signal to provide a corresponding binary output signal, and a local decoder circuit responsive to the binary output signal and the clock signal for generating the reference signal applied to said comparator circuit.

9. The transmission system as claimed in claim 8, wherein said erasing means applies said erasing signal to said local decoder and said local decoder coincides the amplitude of the erasing signal with two preselected amplitude levels of the multilevel signal to form a composite signal thereof, said composite signal being supplied as the erasing signal to said comparator circuit to effect the erasing of the pilot signal component from the transmitted and received, multilevel amplitude digital signal.

10. A transmission system as recited in claim 1 wherein said transmission means further includes
an input half adding circuit including cascade-connected half adders receiving corresponding ones of a succession of binary information bits,
a plurality of storage means including storage means for receiving the outputs of corresponding ones of said half adders, and a further such storage means,
converter means for receiving the outputs of said storage means for converting the binary values thereof to a multilevel output signal, and
said clocking means includes first clocking means producing said pilot signal at the frequency rate of $fs/N$ where $N = 2$ and means connecting the said pilot signal to said cascaded half adder circuits and to said further storage means, and
further clocking means producing a closking signal at the symbol rate of $fs$ and means for supplying the storage binary bit values thereof in parallel to said converter means.

11. A transmission system for transmitting an information signal upon which a pilot signal is imposed, comprising:
a. transmitting means for transmitting the information signal with a pilot signal imposed thereon to receiving means; and
b. said transmitting means comprises:
first storage means for receiving and storing corresponding successive bits of a binary input signal,
second storage means for receiving and storing binary bits corresponding to a digital pilot signal,
first and second clock circuits for providing first and second clock signals, the first clock signal being at a desired symbol rate fs of the multilevel digital output signal and said second clock signal being at a rate $fs/N$ where $= 2, 3, 4, \ldots$, said second clock signal being supplied to said first storage means as the binary input signal thereto,
converting means for converting the binary input signals of said first and second storage means to a corresponding multilevel amplitude digital output signal at the said symbol rate $fs$, said first and second clock circuits providing said first and second clock signals to said first and second storage means for supply of the binary bits stored therein to said converting means for coupling the binary information bit signals and binary pilot signal bits in a predetermined phase relationship in accordance with the phase difference between the first and second clock signals to produce a corresponding multilevel digital output signal at the said symbol rate $fs$.

12. A transmission system for transmitting an information signal upon which there is imposed a synchronizing pilot signal, said system comprising:
transmitting means for transmitting the information signal to receiving means and including:
means for amplitude modulating a carrier signal of a selected frequency with the information signal to be transmitted, to produce a modulated carrier signal,
means providing a synchronizing pilot signal at a frequency substantially equal to that of the carrier signal, and
means for coupling the synchronizing pilot signal to the modulated carrier signal in an inphase relationship to the composite vector of the information signal modulation components disposed in a range above and below the frequency of the pilot signal, the pilot signal thereby being of a frequency within the bandwidth of the information signal, for transmission to the receiving means; and
receiving means for receiving the transmitted signal from said transmitting means and producing a demodulated output signal corresponding to the information signal, said receiving means including:
means for dividing the received signal into first and second signals,
narrow band filter means for filtering the first signal for extracting the frequency components thereof lying within a narrow range of frequencies extending symmetrically above and below the frequency of the pilot signal thereby to reproduce at said receiving means a pilot signal corresponding in frequency and phase to that of said transmitting means,
demodulator means receiving the second signal from said receiving means and responsive to the reproduced pilot signal output of said narrow band filter means for demodulating the said second signal to produce a demodulated output signal, the demodulated output signal having upper and lower sidebands with the lower sideband including an undesired d.c. component, and
erasing means for coupling a d.c. signal, of an amplitude and polarity relative to said undesired d.c. component, to the output of said demodulator means thereby to erase the undesired d.c. component therein.

13. A transmission system as claimed in claim 12, wherein the information signal is a multilevel digital signal.

14. The transmission system as claimed in claim 12, wherein said transmitting means includes band filter means for filtering the output signal derived from said coupling means to provide a vestigial side band signal for transmission.

15. A receiver for use in a transmitting system which transmits an information signal by modulating a carrier signal of a selected frequency with the information signal and furthermore transmits the pilot signal of a frequency equal to the carrier signal within the bandwidth of the information signal modulated on the carrier to produce a demodulated output signal corresponding to the information signal transmitted, comprising:

means for dividing the received signal into first and second signals, narrow band filter means for filtering the first signal for extracting the frequency components thereof lying within a narrow range of frequencies extending symmetrically above and below the frequency of the pilot signal thereby to reproduce at said receiving means a pilot signal corresponding in frequency and phase to that of said transmitting means, demodulator means receiving the second signal from said receiving means and responsive to the reproduced pilot signal output of said narrow band filter means for demodulating the said second signal to produce a demodulated output signal, the demodulated output signal having upper and lower sidebands, the lower sideband including an undesired DC component, and said receiving means includes erasing means for coupling a DC signal of an amplitude level and opposite polarity relative to the said undesired DC component signal to the output of said demodulator means thereby to erase the undesired DC component therein.

* * * * *

UNITED STATES PATENT AND TRADEMARK OFFICE
CERTIFICATE OF CORRECTION

PATENT NO. : 3,959,726
DATED : May 25, 1976
INVENTOR(S) : Shigehiko Hinoshita et al It is certified that error appears in the above-identified patent and that said Letters Patent are hereby corrected as shown below:

```
Column  6, line 44, change "n" to --n--.
Column  7, line 13, change "eye" to --"eye"--.
Column  7, line 15, change "eye" to --"eye"--.
Column  7, line 32, change "eye" to --"eye"--.
Column  8, line 31, change "eye" to --"eye"--.
Column  8, line 33, change "t" to --t--.
Column  8, line 37, change "eye" to --"eye"--.
Column  8, line 46, change "eye" to --"eye"--.
Column 10, line  5, change "l" to --"l"--.
Column 11, line 56, change "closking" to --clocking--.
```

Signed and Sealed this

Twenty-fourth Day of August 1976

[SEAL]

Attest:

RUTH C. MASON
*Attesting Officer*

C. MARSHALL DANN
*Commissioner of Patents and Trademarks*